United States Patent
Polegato Moretti

(10) Patent No.: US 7,096,604 B2
(45) Date of Patent: Aug. 29, 2006

(54) MID-SOLE FOR WATERPROOF BREATHABLE SOLES FOR SHOES, AND WATERPROOF BREATHABLE SOLE COMPRISING SAID MID-SOLE

(75) Inventor: Mario Polegato Moretti, Crocetta del Montello (IT)

(73) Assignee: GEOX S.p.A., Montebelluna (IT)

( * ) Notice: Subject to any disclaimer, the term of this patent is extended or adjusted under 35 U.S.C. 154(b) by 10 days.

(21) Appl. No.: 10/399,395

(22) PCT Filed: Oct. 12, 2001

(86) PCT No.: PCT/EP01/11834

§ 371 (c)(1),
(2), (4) Date: Apr. 21, 2003

(87) PCT Pub. No.: WO02/32246

PCT Pub. Date: Apr. 25, 2002

(65) Prior Publication Data

US 2004/0035022 A1    Feb. 26, 2004

(30) Foreign Application Priority Data

Oct. 19, 2000   (IT)   .................... PD2000A0242

(51) Int. Cl.
 *A43B 13/12*   (2006.01)
 *A43B 13/14*   (2006.01)
 *A43B 23/26*   (2006.01)
 *A43B 7/06*    (2006.01)
 *A43B 13/18*   (2006.01)

(52) U.S. Cl. ............................ 36/30 R; 36/98; 36/3 B; 36/25 R

(58) Field of Classification Search ................ 36/30 R, 36/3 B, 103, 29, 28, 32 R, 25 R, 98
See application file for complete search history.

(56) References Cited

U.S. PATENT DOCUMENTS

| | | | |
|---|---|---|---|
| 5,569,507 A | 10/1996 | Goodwin et al. | |
| 5,588,226 A | 12/1996 | Schenkel | |
| 5,607,745 A * | 3/1997 | Ogden | 36/3 B |
| 5,714,229 A * | 2/1998 | Ogden | 36/3 B |
| 5,746,012 A * | 5/1998 | Caletti et al. | 36/3 B |
| 5,983,524 A * | 11/1999 | Polegato | 36/30 R |
| 6,389,711 B1 * | 5/2002 | Polegato | 36/3 B |
| 6,408,541 B1 * | 6/2002 | Moretti | 36/30 R |
| 6,508,017 B1 * | 1/2003 | DeBarro et al. | 36/28 |
| 6,581,305 B1 * | 6/2003 | Ho | 36/3 B |
| 6,655,048 B1 * | 12/2003 | Moretti | 36/3 B |
| 6,681,500 B1 * | 1/2004 | Moretti | 36/3 B |

FOREIGN PATENT DOCUMENTS

| | | |
|---|---|---|
| DE | 27 37 756 | 3/1979 |
| FR | 2 367 606 | 5/1978 |
| GB | 2 264 626 | 9/1993 |
| JP | 2000 175701 | 6/2000 |
| WO | 95 33007 | 12/1995 |
| WO | 98 51177 | 11/1998 |
| WO | 01 78542 | 10/2001 |

* cited by examiner

*Primary Examiner*—Anthony Stashick
(74) *Attorney, Agent, or Firm*—Oblon, Spivak, McClelland, Maier & Neustadt, P.C.

(57) ABSTRACT

A mid-sole for waterproof and breathable soles for shoes, which includes a waterproof and breathable membrane and at least one lower layer made of breathable elongation-preventing composite material, which is monolithically coupled to the peripheral region of the membrane and, in the corresponding region, to the tread of the sole. The sole is provided with a mid-sole.

11 Claims, 2 Drawing Sheets

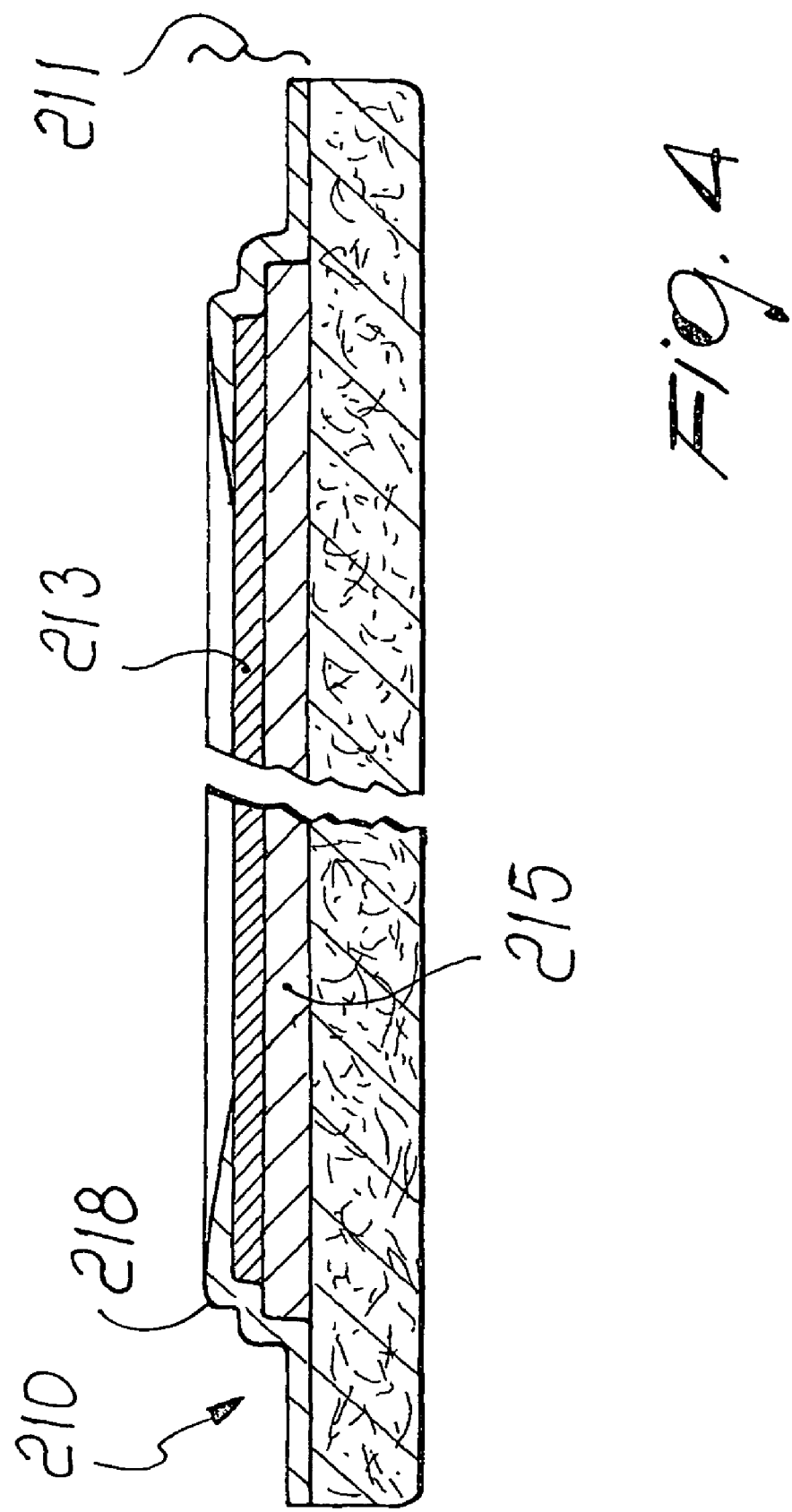

MID-SOLE FOR WATERPROOF BREATHABLE SOLES FOR SHOES, AND WATERPROOF BREATHABLE SOLE COMPRISING SAID MID-SOLE

TECHNICAL FIELD

The present invention relates to an improved mid-sole for waterproof breathable soles for shoes.

The invention also relates to the waterproof breathable sole that comprises said mid-sole.

BACKGROUND ART

Plastic waterproof breathable soles for shoes are already known.

One such sole is disclosed in the commonly assigned U.S. Pat. No. 5,983,524 and EP-0858270, hereby incorporated by reference.

In this case, the sole comprises:

a mid-sole with a membrane made of waterproof breathable material, associated with a lower protective layer made of a material which is resistant to hydrolysis, water-repellent, breathable and/or perforated; a tread made of perforated elastomer, which is perimetrically joined hermetically to the mid-sole.

The waterproof breathable sole disclosed in the commonly assigned U.S. Ser. No. 09/423,299 and EPA-98924244.1, hereby incorporated by reference, is also known; it comprises a preassembled insert, in which there is a waterproof breathable membrane associated with a lower protective layer made of a material which is resistant to hydrolysis, water-repellent, breathable and/or perforated.

The insert is completed by an element which is molded or assembled over it, surrounds the membrane and the protective layer, and is joined hermetically thereto.

The insert is part of a mid-sole and is joined, together with said mid-sole, to a tread made of perforated plastics, which is molded or assembled over them.

The sole disclosed in U.S. Pat. No. 5,598,644 and EP-0619959 by the same Applicant, hereby incorporated by reference, is also known; it comprises a leather tread which is at least partially covered, in an upward region, by means of a mid-sole constituted by a waterproof breathable membrane and by a perimetric plastic element which is sealed to the membrane and is monolithically associated with the tread.

If the tread is made of perforated plastics, the protective element arranged below the membrane is designed to protect said membrane from perforation by foreign objects that have passed accidentally through the holes.

Although the above described soles have been commercially available for years and are unanimously acknowledged to ensure correct exchange of heat and water vapor between the microclimate inside the shoe and the external one, they are not free of drawbacks, including in particular the tendency of the membrane to tear because of the difference between its traction elasticity modulus and that of the tread, with which it is assembled monolithically at its peripheral region.

The membrane is in fact usually made of expanded polytetrafluoroethylene, a material that has very limited elasticity, while the sole, made of rubber or other polymeric material or leather, must be very elastic and flexible owing to its inherent properties and to the requirements of the application.

Accordingly, the membrane is unable to absorb the stresses induced in it by the flexural deformations of the sole in movements during use and accordingly tends to tear and lose its waterproof properties.

The protective element arranged below the membrane, which is usually made of polyester felt, has been found unable, by itself, to absorb the tensions induced by the deformations of the sole.

DISCLOSURE OF THE INVENTION

The aim of the present invention is therefore to provide a mid-sole for waterproof breathable soles for shoes, in which elongations of the waterproof breathable membrane beyond limits that can lead to its tearing are avoided during use.

Within this aim, an object is to eliminate the drawbacks of the above mentioned prior art without reducing the waterproofing and breathable capability of the mid-sole and sole.

Another object is to provide a mid-sole and the corresponding sole that does not entail particular constructive complications with respect to known ones.

Another object is to provide a mid-sole and the corresponding sole whose costs are competitive with respect to those of known types.

This aim and these and other objects, which will become better apparent hereinafter, are achieved by a mid-sole for waterproof and breathable soles for shoes, characterized in that it comprises:

a waterproof and breathable membrane;
at least one lower layer made of breathable elongation-preventing composite material, which is monolithically coupled to the peripheral region of said membrane and, in the corresponding region, to the tread of the sole.

BRIEF DESCRIPTION OF THE DRAWINGS

Further characteristics and advantages of the present invention will become better apparent from the detailed description of some embodiments thereof, illustrated only by way of non-limitative example in the accompanying drawings, wherein:

FIG. 4 is a cross-sectional view of a waterproof breathable sole for shoes with a mid-sole according to the invention in a third embodiment.

WAYS OF CARRYING OUT THE INVENTION

Figure 1:
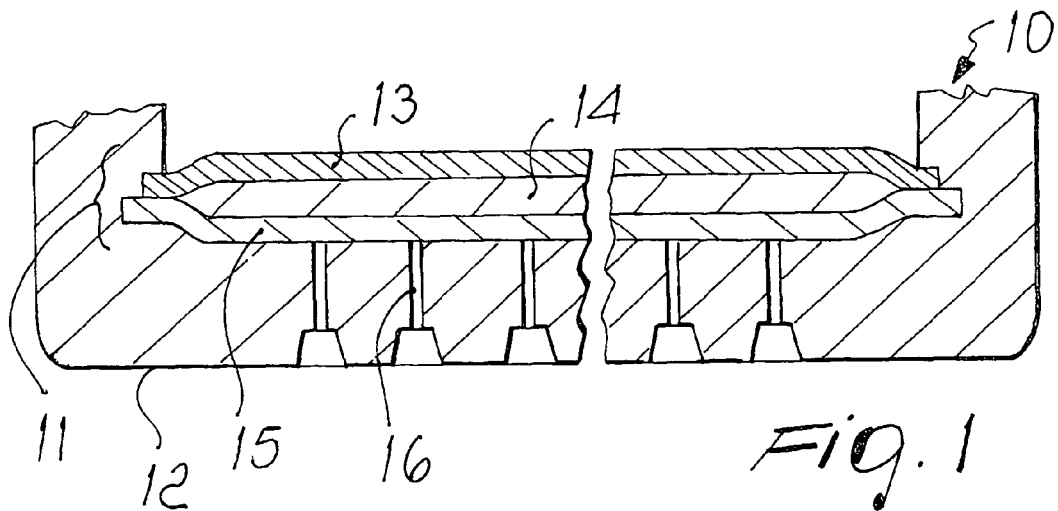
FIG. 1 is a cross-sectional view of a waterproof breathable sole for shoes with a mid-sole according to the invention in a first embodiment.
Figure 2:
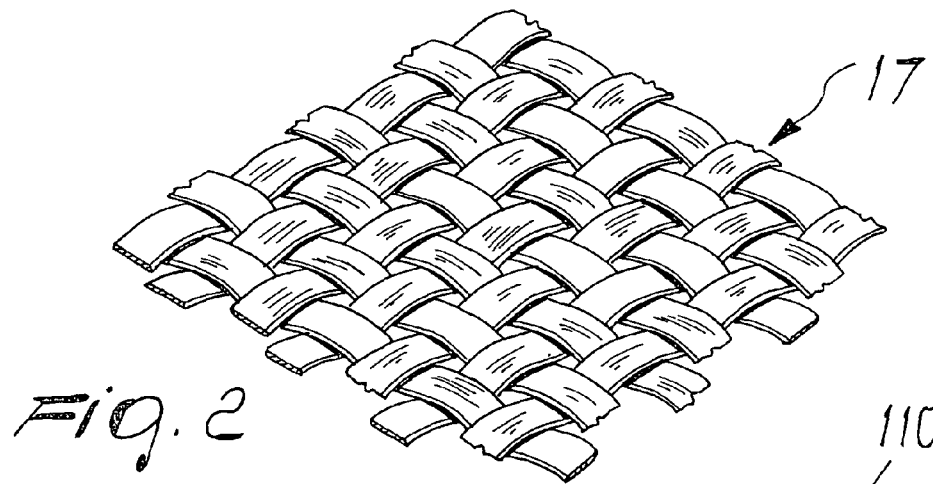
FIG. 2 is a perspective view of a component of the mid-sole of FIG. 1.

With reference to FIGS. 1 and 2, a sole for shoes is generally designated by the reference numeral 10 and comprises a composite mid-sole 11 and a tread 12.

According to the invention, the mid-sole 11 comprises, from top to bottom, a membrane 13 made of a waterproof breathable material which is commonly commercially available, for example expanded polytetrafluoroethylene, a protective layer 14 made of a material which is resistant to hydrolysis, water-repellent, breathable and/or perforated (usually polyester felt), and at least one layer 15 made of a breathable elongation-preventing composite material which is monolithically coupled to the peripheral region of said membrane 13 and, in the corresponding region, to the tread 12 of the sole 10.

Conveniently, in this case the tread 12 is made of plastic material, such as rubber, polyurethane, or other polymers, provided with through holes 16 which extend from the region of contact with the ground to the layer 15.

The coupling between the membrane 13, the elongation-preventing layer 15 and the tread 12 can be conveniently provided by means of suitable adhesives, for example of the hot-melt type, or by hot pressing or overmolding the tread 12.

As regards the elongation-preventing layer 15, as already mentioned it must be breathable and must have a very high traction elasticity modulus, preferably a breaking stress of more than 1000 N/cm (on fabrics, the test is performed on a specimen with a useful width of 5 cm and a useful length of 20 cm and thickness is considered irrelevant) with an ultimate elongation of less than 5%.

Said layer can be made of fibers of carbon and/or glass and/or polypropylene, woven with at least four different orientations: weft, warp, oblique right to left, and oblique left to right.

This is done to conveniently ensure a high elasticity modulus in a plurality of directions, although it is possible to consider as efficient the longitudinal and transverse directions of the sole.

FIG. 2 illustrates a lattice 17 which can be used and is constituted by bands of woven and impregnated fibers which leave ample spaces for air passage.

The fibers are impregnated with appropriate resins such as phenolic resins, polyurethane resins, epoxy resins, natural or synthetic rubbers, which are designed to transmit the stress to the entire set of fibers.

Impregnation must be performed so as to avoid creating a compact layer, in order to avoid compromising breathability.

As an alternative, the layer 15 can be made of fibers having characteristics similar to the ones described above but with a low melting point, so that by means of a hot pressing process it is possible to melt part of said fibers so as to monolithically couple them by melting and produce impregnation in this manner.

With the above described mid-sole, the stresses induced by the tread 12 of the sole 10 are no longer discharged onto the membrane 13 but are discharged onto the elongation-preventing layer 15 associated perimetrically therewith, which prevents it from elongating and therefore tearing.

In some cases it can be convenient to do without the protective layer 14, if perforation-preventing protection can be conveniently performed by the elongation-preventing layer 15.

Figure 3:
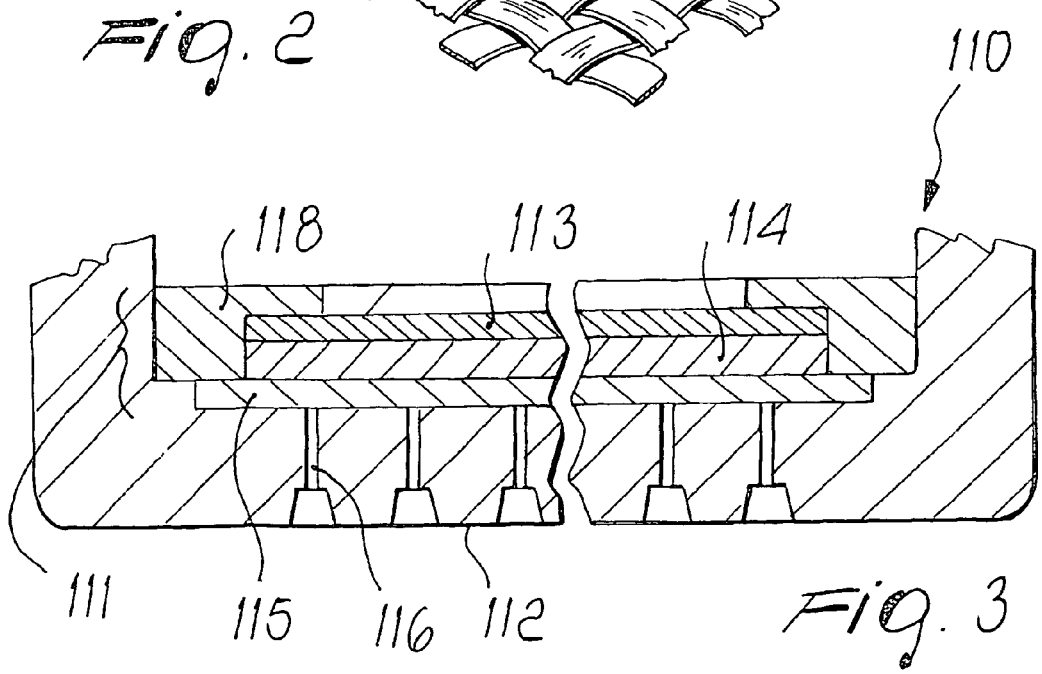
FIG. 3 is a cross-sectional view of a waterproof breathable sole for shoes with a mid-sole according to the invention in a second embodiment.

With reference now to FIG. 3, in a second embodiment a sole is generally designated by the reference numeral 110 and comprises a composite mid-sole 111 and a tread 112.

According to this embodiment of the invention, the mid-sole 111 comprises a membrane 113 made of waterproof breathable material of the type cited in the first embodiment, associated in a downward region with a protective layer 114 which is usually made of polyester felt.

Below the protective layer 114 there is at least one layer 115 made of composite breathable elongation-preventing material.

In this second embodiment, the components of the mid-sole 111 are assembled together with a premolded or otherwise preassembled perimetric insert 118, to which said tread 112 is joined by hot pressing or gluing with perimetric sealing, or by overmolding; said tread is conveniently made of plastics and has through holes 116 of the same type as the holes 16 described above.

The perimetric insert 118 is made of plastics and includes and/or associates the edges of the membrane 113, of the protective layer 114 and of the elongation-preventing layer 115.

The perimetric element 118 is therefore the element that associates the edges of the membrane 113 and of the elongation-preventing layer 115, ensuring that the stresses induced by the tread 112, which in turn adheres perimetrically to the layer 115, make it act directly as a contrasting element.

In this case also, with layers 115 capable of also performing the perforation-preventing function it is possible to omit the protective layer 114.

With reference now to FIG. 4, a sole according to the invention is generally designated by the reference numeral 210 and comprises a composite mid-sole 211 and a tread 121, which in this case is constituted by leather, hide or materials which are equivalent from the point of view of breathability.

The mid-sole 211 comprises a waterproof breathable membrane 213 of the same type as the preceding ones and at least one lower elongation-preventing breathable layer 215 which is also of the same type as the preceding ones.

The edges of the membrane 213 and of the layer 215 are internal to the edges of the tread 212.

The mid-sole 211 is completed by a perimetric element 218, which is molded or applied over it and monolithically couples in particular the edges of the various components.

The application must be conveniently provided by means of suitable adhesives, for example of the hot-melt type, or by hot-pressing.

In this case, the presence of a protective layer is not necessary, because the tread 212 has no holes, since breathability is ensured by the very characteristics of the material.

In practice it has been found that the intended aim and objects of the present invention have been achieved.

The invention thus conceived is susceptible of numerous modifications and variations, all of which are within the scope of the inventive concept.

A mid-sole for waterproof breathable soles for shoes has in fact been provided in which, during use, elongations of the waterproof breathable membrane beyond limits that can lead to its tearing are avoided.

The breathable and waterproof capabilities of the mid-sole and sole have in any case remained unchanged by way of the permeability of the elongation-preventing layer, and no constructive complications have been added to the product.

All the details may further be replaced with other technically equivalent elements.

In practice, the materials employed, so long as they are compatible with the contingent use, as well as the dimensions, may be any according to requirements.

The disclosures in Italian Patent Application No. PD2000A000242 from which this application claims priority are incorporated herein by reference.

The invention claimed is:

1. An improved mid-sole for a waterproof and breathable sole for shoes, comprising:
   a waterproof and breathable membrane;
   at least one lower layer configured to provide breathability while preventing elongation of the membrane, said lower layer being monolithically fixed to said membrane exclusively at a peripheral region of said lower layer to provide an area of the membrane inside said peripheral region not affixed to the lower layer, said lower layer being further configured to be monolithically fixable to a tread of a sole in a region corresponding to the peripheral region;

a protective layer made of a material resistant to hydrolysis, water-repellent, breathable or perforated, said protective layer being arranged between said membrane and said layer of breathable elongation-preventing composite material.

2. The mid-sole according to claim 1, wherein the monolithic fixing between said membrane and said lower layer is provided by at least one of an adhesive and hot pressing.

3. The mid-sole according to claim 1, wherein the monolithic fixing between said membrane and said lower layer is provided with a perimetric seal, by hot pressing, gluing or overmolding, with a pre-molded or pre-assembled insert.

4. The mid-sole according to claim 1, wherein said lower layer has a breaking stress of more than 1000 N/cm with an ultimate elongation of less than 5%.

5. The mid-sole according to claim 4, wherein said lower layer is made of fibers of at least one of carbon, glass, and polypropylene woven with at least four different orientations: weft, warp, oblique right to left, oblique left to right, said fibers being impregnated, to avoid creating a compact layer, with resins such as phenolic resins, polyurethane resins, epoxy resins, natural or synthetic rubbers, configured to transmit stress to an entire set of said fibers.

6. The mid-sole according to claim 4, wherein said lower layer is made of fibers of at least one of carbon, glass, and polypropylene, woven with at least four different orientations: weft, warp, oblique right to left, oblique left to right, said fibers having a low melting point, whereby part of the fibers are melted by a hot pressing process for monolithical coupling thereof through melting and consequent impregnation.

7. The mid-sole according to claim 4, wherein said lower layer is constituted by a lattice of bands of woven and impregnated fibers.

8. A sole comprising a mid-sole according to claim 1, and further comprising a tread assembled to said mid-sole.

9. A sole according to claim 8, wherein said tread is made of plastics and provided with through holes that extend from a region of contact with the ground to said lower layer made of composite material, said tread being assembled to said mid-sole by perimetric gluing or hot pressing or overmolding.

10. A sole according to claim 8, wherein said tread is made of leather, hide or materials with equivalent breathability, said tread being assembled to said mid-sole by perimetric gluing or hot pressing or by overmolding thereon said insert.

11. The mid-sole according to claim 1, wherein said lower layer includes woven fibers of carbon and/or glass and/or polypropylene.

* * * * *